July 26, 1966 R. DI PASQUALE ETAL 3,262,818
TERMINAL SYSTEM FOR LEAKPROOF ELECTROCHEMICAL GENERATORS
Filed Sept. 25, 1963

INVENTORS:
RENATO DI PASQUALE
OTTO C. WAGNER
BY
Karl J. Ross
AGENT.

United States Patent Office 3,262,818
Patented July 26, 1966

3,262,818
TERMINAL SYSTEM FOR LEAKPROOF
ELECTROCHEMICAL GENERATORS
Renato Di Pasquale, Rutherford, N.J., and Otto C.
Wagner, Bronx, N.Y., assignors to Yardney International Corporation, New York, N.Y., a corporation of New York
Filed Sept. 25, 1963, Ser. No. 311,537
9 Claims. (Cl. 136—135)

The present invention relates to terminal systems for leak-proof and/or hermetically sealed electrochemical generators, such as primary and secondary electrochemical cells and batteries, as well as to methods of making same.

The problems involved in providing terminal systems for cells and batteries employing liquid and semiliquid electrolytes are well-known. For example, it has long been the practice to seal terminal members into cell casings with the aid of O-rings and the like, potting compounds, elastomeric or synthetic-resin sealants and even by casting portions of the cell casing around the metallic terminal. While these methods have received widespread application as a consequence of the fact that they are, for the most part, inexpensive, it should be noted that they are only limitedly effective when hermetically sealed cells and batteries are to be provided and frequently leak when liquid electrolytes are employed as is the case in alkaline systems (e.g. silver/zinc and silver/cadmium cells). The earlier systems mentioned above have failed to provide perfect seals usually as a consequence of the difficulty in obtaining an effective bond between the metal of the terminal and the plastic of the cell casing.

It is the principal object of the present invention to provide a terminal system for leak-proof cells and batteries and for hermetically sealed electrochemical generators of this type wherein the foregoing disadvantages can be avoided and wherein an effective liquid and/or gas-tight joint can be produced between the terminal and the cell casing.

It is a corollary object of the present invention to provide an electrochemical generator incorporating a terminal system of this character as well as a method of producing the terminal and the electrochemical generator.

We have discovered that it is possible to provide a liquid and/or gas-tight joint between a metallic terminal and a synthetic resin cell casing by the incorporation of a synthetic resin, readily bonded to the casing, in the terminal system. It is, therefore, a principal feature of the present invention to provide a terminal consisting essentially of a conductive body having at least an outer portion composed of porous sintered material and permeated with an electrically insulating synthetic resin which simultaneously coats the porous portion and serves as an intermediary in the bonding of the terminal to the casing while filling the pores of the terminal body to prevent passage of fluid therethrough. Thus an electrochemical generator, according to the invention, can comprise a hermetically sealed housing or casing having a throughgoing passage communicating with the interior thereof, the housing or casing enclosing the electrode means, electrolyte and any necessary separator, while the electrically conductive terminal is connected to the electrode means and extends through the passage, the terminal having at least an outer zone of porous sintered material, as mentioned above, permeated with the synthetic resin and bonded to the housing around the perimeter of the passage. While, for best results, it is desirable that the housing be composed of a synthetic resin thermally fusible or solvent bondable to the synthetic resin permeating the porous body and, if desirable, of the same material, it is also contemplated, according to the invention, to employ intermediate layers of synthetic substances (e.g. synthetic-resin cements) to join the terminal system to the casing.

According to a more specific feature of this invention, the terminal can be provided with an annular flange juxtaposed with a surface of the housing surrounding the passage and sealed to the housing therealong. Thus the cell casing may be a hermetically sealed housing of the button or cartridge type through which the terminal or terminals project axially and form contact portions at either end of the cell, the contact portions being regions of the porous body rendered free from the synthetic resin. The synthetic resin can be impregnated into the porous sintered body by vacuum techniques, i.e. by subjecting the porous structure to reduced pressure, thereby drawing the gases normally filling the pores therefrom so as to render the body receptive to the synthetic resin in a liquid state. In addition, the inherent capillarity of the porous body can be employed to draw the synthetic resin into the pores or, alternatively, a pressure differential can be established across the terminal to drive the synthetic resin into the body. The resin can be brought to a state of low viscosity (e.g. approaching that of water) by heating or by the addition of a suitable solvent which can then be volatilized to leave the pores of the body substantially completely impregnated with the synthetic resin. In the latter case, it is desirable to volatilize the solvent slowly so that the solvent release takes place without any tendency to render the synthetic resin porous. The resulting body cannot be permeated by the fluids present within or outside the cell and is covered with a layer or film of the nonconductive resin so that it may be bonded firmly to the cell casing with the aid of a cement, conventional heat-sealing methods, ultrasonic sealing techniques or the like. It has been found that the bond between the metal terminal and the synthetic resin casing is significantly improved over those of earlier methods presumably because the large surface area of the sintered metal substrate permits firm adhesion of the synthetic resin thereto while the liquid synthetic resin applied to the porous body has a significantly large surface tension further insuring firm bonding even when the synthetic resin hardens. Moreover, the sintering of the particular material to produce the porous body results in a clean surface generally requiring no further treatment to accept the synthetic resin. When the terminal structure is constituted as a plug, in direct abutting contact with the elecrode material and/or external contacts, the synthetic resin on the contacting surfaces can be stripped therefrom by abrasive action. The stripped or cleaned surfaces can then be bonded to contact layers of solid metal (e.g. metal strips) by cold-welding, pressure forging, dip soldering or ultrasonic bonding to reduce the contact resistance and increase the effectiveness of the electrical connection.

According to a further feature of this invention, the terminal structure includes a core or central portion partly enclosed within a sheath of material sintered thereto, the porous sheath being permeated with a synthetic resin as mentioned above and bonded to the cell casing. In this case the conductivity of the solid terminal can be realized simultaneously with the improved seal-formation characterizing the porous bodies mentioned above. We have discovered that this method is particularly suitable for use with systems wherein the electrodes are connected with the terminal via metal leads which would otherwise be subject to attack by electrolyte. In this case a continuous sheath encloses those portions of the terminal and the lead within the cell casing in contact with the electrolyte. It has been found that this prevents internal cell shorting normally deriving from bridging (i.e. growth of active material on the leads) and creepage of the active material of the cell. Moreover, since the sheath is impregnated with a synthetic resin and thus electrically insulating, embrittlement of the leads under electrochemical attack (e.g. anodization) is prevented even when the leads are composed of silver or copper.

While almost any synthetic resin which can be impregnated into the porous body, can be employed, in accordance with the present invention, it has been found to be desirable to use similar materials for the impregnant and for the cell casing, when the latter is composed of a polyacrylate, nylon, polyethylene, or polystyrene. It should be noted that nonmetallic pulverulent materials can be sintered to form the porous sheath when a core of conductive material is employed. When such a core is not used, particles of a metal such as silver, copper, nickel or iron can form the terminal body.

The above and other objects, features and advantages will become more readily apparent from the following description, reference being made to the appended drawing in which.

Figure 1:
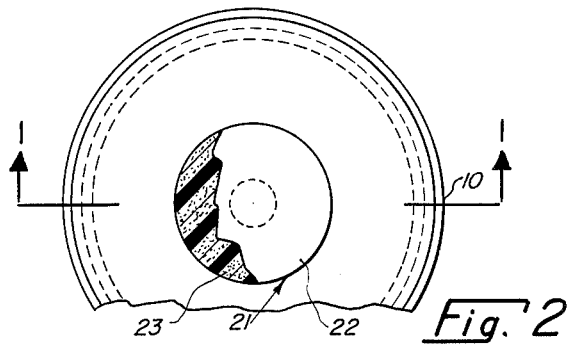
FIG. 1 is an axial cross-sectional view through a button cell incorporating the present invention.
Figure 2:
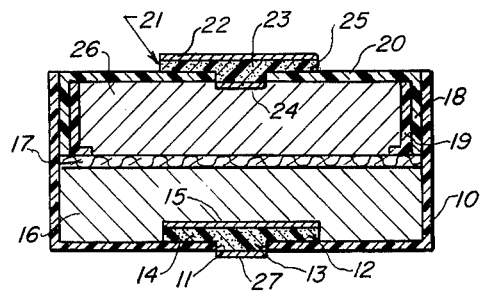
FIG. 2 is a partial plan view of the cell with part broken away.

In FIGS. 1 and 2 we show a button cell comprising an outer cell casing 10 of a synthetic resin material such as a Cycolac, (ABS) in which is disposed a mass 16 of anode material (e.g. silver oxide) the shell 10 having an aperture 11 through which the shank portion 13 of a terminal plug 12 projects. This plug is formed with a flange 14 overlying the bottom of shell 10 and surrounding the passage 11. A separator layer 17 of cellulosic material is interposed between the anodic mass 16 and the cathodic mass 26 (which can be composed of electrochemically active zinc or cadmium) the latter being surrounded by the upper casing portion 18 which fits within shell 10 and is sealed to the latter by conventional means. The cover portion 20 of shell 18 is formed with a central passage to which the shank portion of a terminal 21 projects. The terminal body 23 has an annular flange 25 overlying cover portion 20 and bonded thereto along their respective interface. Terminal bodies 12 and 23 are both formed from masses of sintered particles impregnated with synthetic resin and can be welded by thermal bonding or ultrasonic techniques to the respective shells 10 and 20 along the annular flanges. Since impregnation of the porous body with the synthetic resin results in the formation of a coating of the nonconductive resin around the terminal, the opposite faces 23' and 23" of the body 23 can be stripped of the synthetic resin by abrasive action (e.g. with emery cloth) and fused to conductive strips 22 and 24 adapted to provide external contact for the battery and electrical connection with the cathode material 26, respectively. Similarly, the corresponding faces of terminal 12 can be abraded and provided with contact strips 15 and 27 adapted to engage the anode material 16 and an external contact, respectively.

*Example I*

Figure 3:
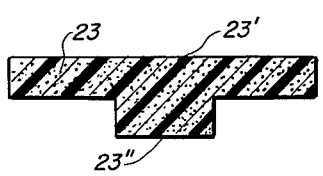
FIG. 3 is an axial cross-sectional view through a terminal for a button cell.

Terminal structures of the type shown in FIG. 3 and having diameters of about 2 cm. are produced by molda mass of silver particles having particle sizes ranging between 10 and 50 microns into the configuration illustrated. The shaped mass of particles is introduced into a sintering furnace and heated at a temperature of approximately 600° C. to coherency, a pressure of 140/cm.² being applied. The density of the sintered porous terminal body is then found to be about 3.5 gr./cc. A watery solution of Cycolac (acrylonitrile-butadiene-styrene) resin is prepared by dissolving the granular material in methylethylketone at a temperature somewhat below the boiling point of the solvent. The porous terminal body is impregnated with the solution by immersion therein after subjection to reduced pressure (approximately 25 mm. of mercury for five minutes) whereupon the solution penetrates deeply into the pores as is evidenced by an 80–90% weight increase of the terminals upon evaporation of the solvent. Solvent release is carried out slowly so that the resin portion of the body has no significant porosity. We have found that ultrasonic impregnation facilitates the penetration of the synthetic resin into the pores of the metal. Accordingly, the porous terminal bodies can be exposed to high-frequency vibrations (10–500 kilocycles/sec.) upon immersion in the synthetic-resin solution. When volatilization of solvent is completed, as evidenced by no further loss of weight, the upper and lower faces 23', 23" of the terminal bodies are burnished with a wire brush or emery wheel to reveal the respective clean metal face to which a thin layer of silver or copper is joined. This joining operation can be effected by spotwelding or ultrasonic fusion in the conventional manner, the layer having a thickness on the order of 10 mils. Subsequently, the terminal bodies are positioned in their respective apertures in the cells 10 and 18, also composed of ABS resin (acrylonitrile-butadiene-styrene). The electrodes, separator and inner cell 19 are then assembled in the usual manner with the two casing portions 10 and 18 being hermetically joined together by solvent welding. The terminal bodies have flanges overlying the casing which are sealed thereto by permitting methylethylketone to flow along the interface and applying pressure, thereby producing what is generally designated as a solvent weld. Sintering temperatures between 300° C. and 800° C. have been found to be generally suitable for the silver particles.

*Example II*

A cylindrical copper terminal adapted to pass through an aperture in a polyethylene cell casing and having a diameter of approximately 1 cm. and a length of about 2.5 cm. is sintered from copper particles having an average particle size of 40 microns at a temperature of 700° C. and a pressure of about 500 kg./cm.² so that a density of 8 gr./cc. results. The body is impregnated with liquid polyethylene at a temperature at which the latter flows readily into the interstices of the terminal body. The impregnated member is abraded to provide the necessary contact surfaces and is then heat-sealed to the cell casing.

*Example III*

In a manner similar to that described in Example II nickel particles having an average size of 25 microns are sintered at a temperature on the order of 1000° C. to a density of about 4 gr./cc. at a pressure of 700 kg./cm.². The terminal body was a rectangle having a thickness of 60 mils and a contact surface of about 2 cm.². The porous nickel body evidenced a weight gain of about 90% when treated with nylon in a liquid state and was then joined to a nylon casing by ultrasonic welding (at a frequency of about 3 megacycles). In general, the weight gain of the porous elements impregnated with the synthetic resin was between 80–90%, sintering temperatures of 400–850° C. and 600–1200° C. were employed successfully for copper and nickel respectively. Conventional nylon cements were also used to join the nylon-impregnated bodies to cell casings in hermetic and leak-proof cells. It may be stated generally that particle sizes between 10 and 50 microns are suitable for the practice of the instant invention.

Figure 5:
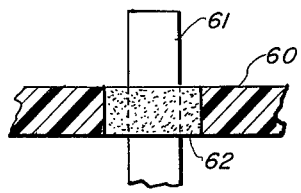
FIG. 5 is a view similar to FIG. 3 illustrating the modified terminal arrangements.
Figure 6:
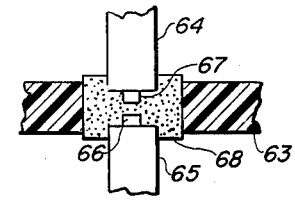
FIG. 6 is a fragmentary cross-sectional view of the terminal portion of still another cell embodying the present invention.
Figure 4:
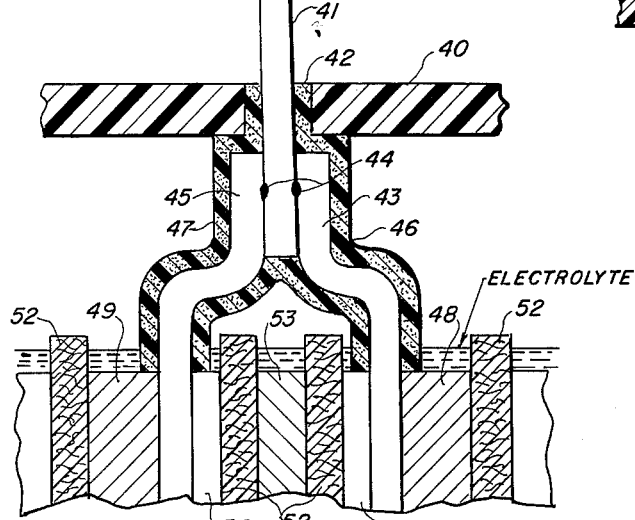
FIG. 4 is a fragmentary cross-sectional view through a cell casing having a leak-proof terminal structure utilizing conductive leads to join the electrode material to the terminal body.

In FIG. 4 we show a modified terminal system wherein a continuous metal core 41 has a pair of metallic leads of 43, 45 joined thereto by spot welding at 44, the leads 43, 45 and that portion of core 41 within the cell casing 40 being enclosed within a sheath 46 of sintered material, the latter being impregnated with a synthetic resin which also forms an insulating coating 47 upon the sheath and thus prevents embrittlement of the leads and creeping of the active material. The leads 43 and 45 are joined in the usual manner to support grids 50, 51 upon which the active material of, say, the electrodes 48, 49 are deposited; separators 52 space the anode material from the cathode material 53. The positive electrodes are advantageously of the silver/silver-oxide type while the negative material can contain zinc or cadmium, the separators 52 including a cellulosic membrane. The sheath 46 is bonded to the cell casing 40 at 42 in the manner previously described. In FIGS. 5 and 6 we show further arrangements employing the same basic principles. In FIG. 5, the sheath 62 of porous material is bonded to the core 61 by the sintering step in which it is formed, the synthetic-resin-impregnated sheath then being joined to the cell casing 60. FIG. 6 shows that the porous body 68 can join two core portions 64, 65, which can be provided with projections 66, 67 for greater rigidity, together and join them to the cell casing 63 when impregnated with the resin.

*Example IV*

A terminal system of the type illustrated in FIG. 4 is produced by spotwelding a pair of silver leads 43, 45 to a copper terminal bar 41. The bar and the leads are then encased by a mass of silver powder having a particle size between 10–50 microns which is sintered to produce the sheath 46 at a temperature of about 800° C. The sheath has a thickness of approximately 20 mils and is impregnated with the ABS resin in solvent. Upon evaporation of the solvent the terminal assembly is joined to the casing 40 by solvent welding.

*Example V*

The method of Example IV is followed except that particles of a ceramic (aluminum oxide) are sintered together to form a sheath around the nickel terminal bar 41, to which the silver leads have been spotwelded. A sintering temperature somewhat less than 1000° C. is employed with a pressure of about 600 kg./cm.$^2$ for the particles having a size of approximately 30 microns. The porous portion or zone is impregnated with synthetic resin and bonded to the cell casing as described in Example IV to produce a hermetic seal.

The invention described and illustrated is believed to admit of many modifications within the ability of persons skilled in the art, all such modifications being considered within the spirit and scope of the appended claims.

What is claimed is:

1. An electrochemical generator comprising a housing having a throughgoing passage communicating with the interior thereof, electrode means within said housing, and an electrically conductive terminal connected to said electrode means and extending through said passage, said terminal having a conductive body portion provided with at least an outer zone of porous sintered material bonded thereto and permeated with an electrically insulating synthetic resin.

2. An electrochemical generator comprising a housing having a throughgoing passage communicating with the interior thereof, electrode means within said housing, and an electrically conductive terminal connected to said electrode means and extending through said passage, said terminal having a conductive body portion provided with at least an annular outer zone of porous sintered material bonded thereto and permeated with an electrically insulating synthetic resin, said synthetic resin being bonded to said housing around the perimeter of said passage.

3. An electrochemical generator as defined in claim 2 wherein said housing is composed of a synthetic resin thermally fusible to the synthetic resin permeating said material.

4. An electrochemical generator as defined in claim 3 wherein said terminal is provided with an annular flange juxtaposed with a surface of said housing surrounding said passage, said terminal being sealed to said housing along said flange.

5. An electrochemical generator as defined in claim 3 wherein said porous sintered material is a metal.

6. An electrochemical generator as defined in claim 5 further comprising a metallic contact strip bonded to a surface of said material free from synthetic resin.

7. An electrochemical generator as defined in claim 5 wherein said porous sintered material is a ceramic.

8. An electrochemical generator as defined in claim 3 wherein said conductive body portion is a continuous metal member surrounded by a sheath of said sintered material.

9. An electrochemical generator as defined in claim 8, further comprising lead means connecting said electrode means with said terminal, said porous sintered material forming a continuous sheath permeated and coated with synthetic resin surrounding said member and said lead means at least in the region of their juncture.

References Cited by the Examiner

UNITED STATES PATENTS

| 2,684,397 | 7/1954 | Gottschall | 136–133 |
| 2,825,748 | 3/1958 | Coler | 136—133 |
| 2,909,450 | 10/1959 | Goldstein | 117—127 |
| 2,920,127 | 7/1960 | Vogt | 136—134 |

WINSTON A. DOUGLAS, *Primary Examiner.*

D. L. WALTON, *Assistant Examiner.*